(12) United States Patent
Suzuki

(10) Patent No.: US 8,214,681 B2
(45) Date of Patent: Jul. 3, 2012

(54) POWER CONTROL SYSTEM, POWER MONITORING DEVICE, RECORD MEDIUM HAVING POWER MONITORING PROGRAM RECORDED THEREIN, AND POWER MONITORING METHOD

(75) Inventor: Youji Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 398 days.

(21) Appl. No.: 12/475,726

(22) Filed: Jun. 1, 2009

(65) Prior Publication Data
US 2009/0299538 A1    Dec. 3, 2009

(30) Foreign Application Priority Data
Jun. 2, 2008    (JP) .................................. 2008-144039

(51) Int. Cl.
*G06F 1/00* (2006.01)
*G06F 11/30* (2006.01)
(52) U.S. Cl. ........... 713/340; 713/300; 713/310; 700/22
(58) Field of Classification Search .................... 700/22, 700/286, 295, 297; 709/221–224; 713/300, 713/310, 340
See application file for complete search history.

(56) References Cited

U.S. PATENT DOCUMENTS

| | | | | |
|---|---|---|---|---|
| 7,453,235 B2 * | 11/2008 | Blair et al. | ..................... | 320/116 |
| 7,462,149 B2 * | 12/2008 | Hawthorne et al. | ........... | 600/300 |
| 2004/0010649 A1 * | 1/2004 | Weaver et al. | ................ | 710/302 |
| 2005/0207079 A1 * | 9/2005 | Tiller et al. | ...................... | 361/64 |
| 2005/0283338 A1 * | 12/2005 | Frederick et al. | ............. | 702/182 |
| 2006/0291085 A1 * | 12/2006 | Suzuki et al. | ................... | 360/71 |
| 2007/0240006 A1 * | 10/2007 | Fung | .............................. | 713/323 |
| 2008/0028246 A1 * | 1/2008 | Witham | ........................ | 713/330 |
| 2009/0249104 A1 * | 10/2009 | Ikeda et al. | .................... | 713/324 |
| 2009/0273358 A1 * | 11/2009 | Arkin | ............................ | 324/754 |
| 2010/0007333 A1 * | 1/2010 | Sekiguchi et al. | ............ | 324/113 |
| 2010/0011234 A1 * | 1/2010 | Malik et al. | ................... | 713/323 |
| 2010/0328849 A1 * | 12/2010 | Ewing et al. | .................. | 361/622 |

FOREIGN PATENT DOCUMENTS

JP    2007088809 A    4/2007

* cited by examiner

*Primary Examiner* — Ramesh Patel

(57) ABSTRACT

The present invention has an object of realizing a power source redundancy of each of devices constructing a network while suppressing a processing load of each device with a simplified configuration. A power monitoring device includes a power configuration generator for preparing power control information based upon device information including necessary power information, being information indicative of a power necessary for operating each monitored device itself, and power status information indicative of a received power in each monitored device, causing a power configuration information storage to store the prepared power control information, and further transmitting the prepared power control information to each monitored device. Further, the monitored device includes a power controller for controlling the power of its own device based upon the transmitted power control information.

15 Claims, 10 Drawing Sheets

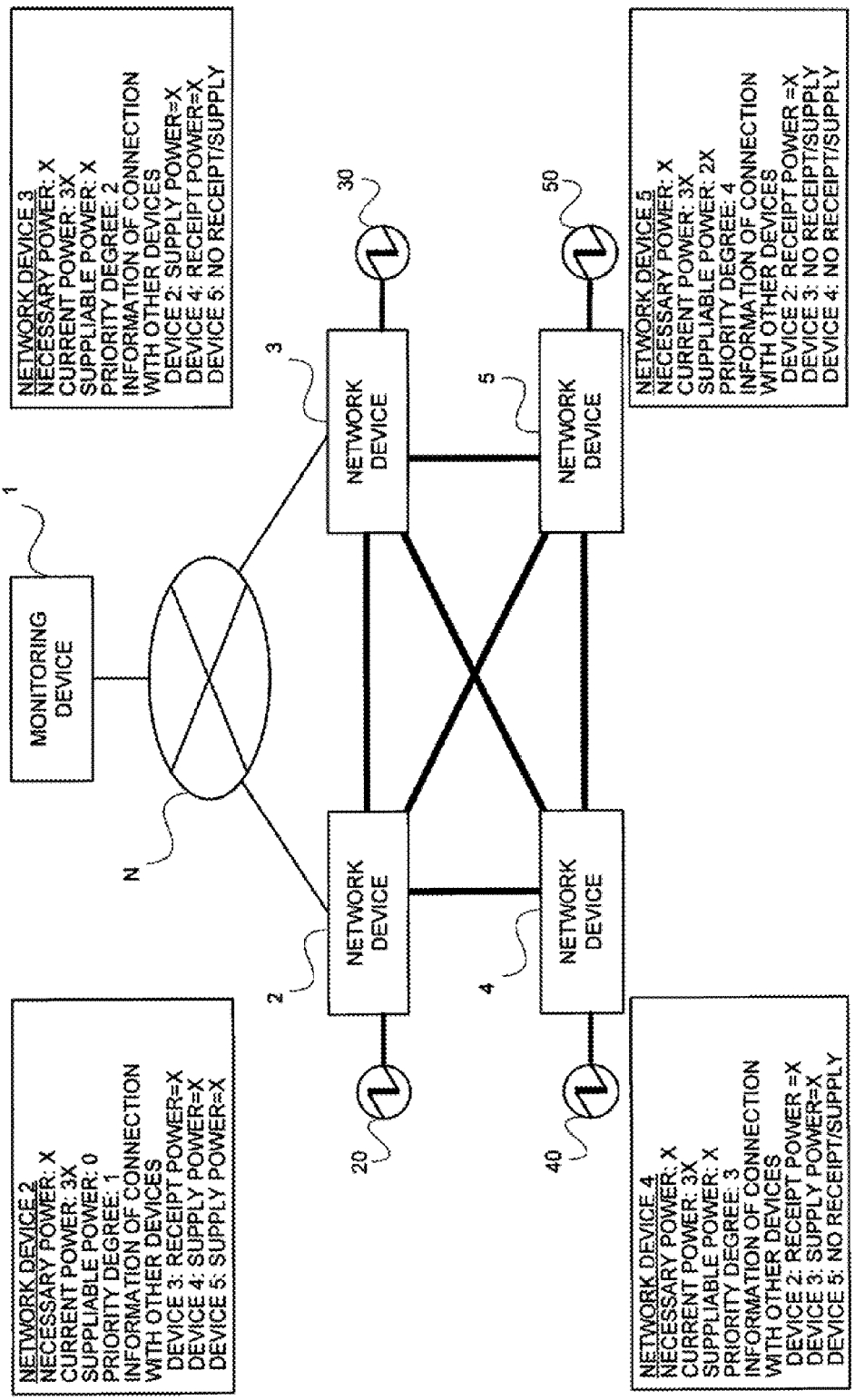

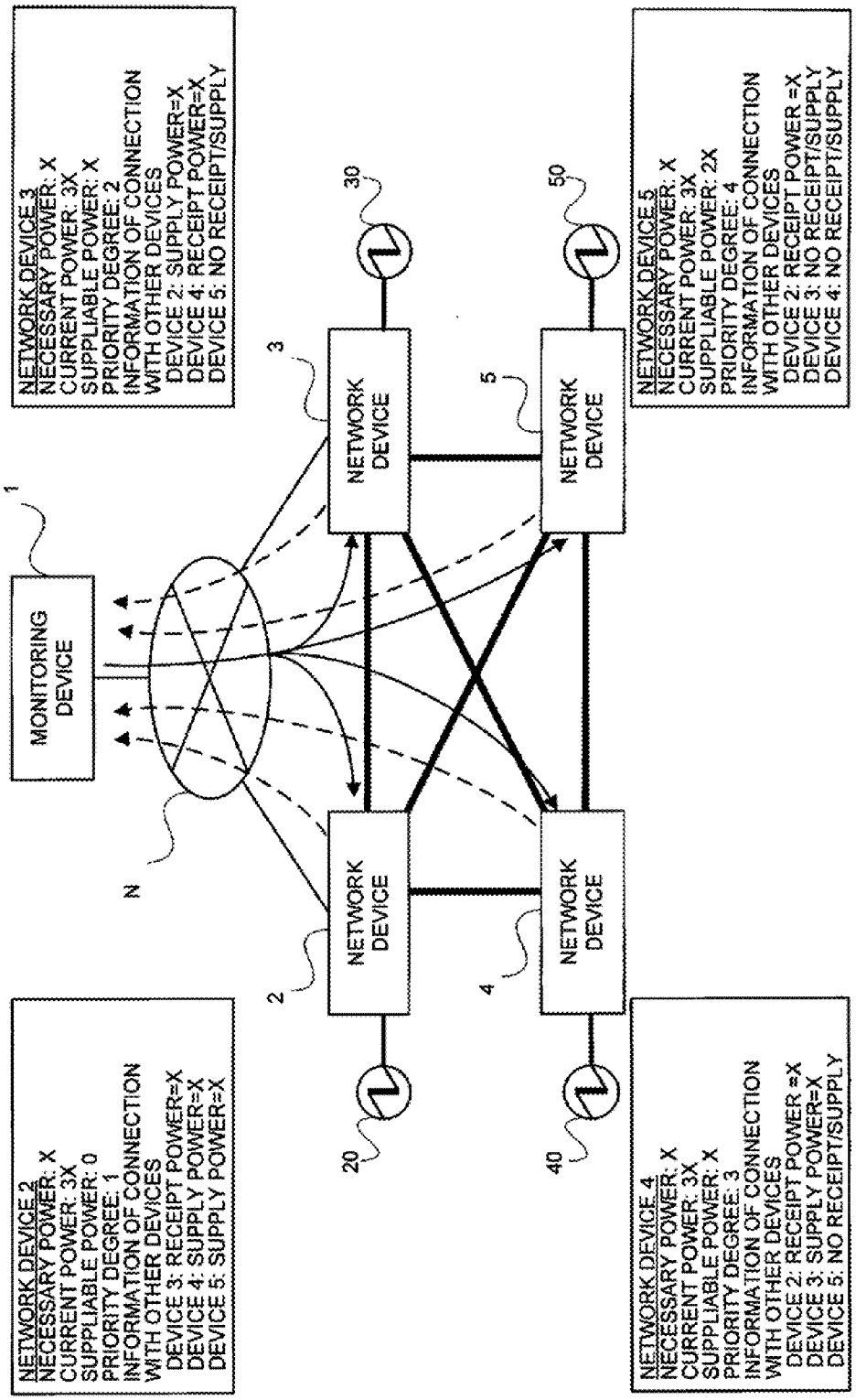

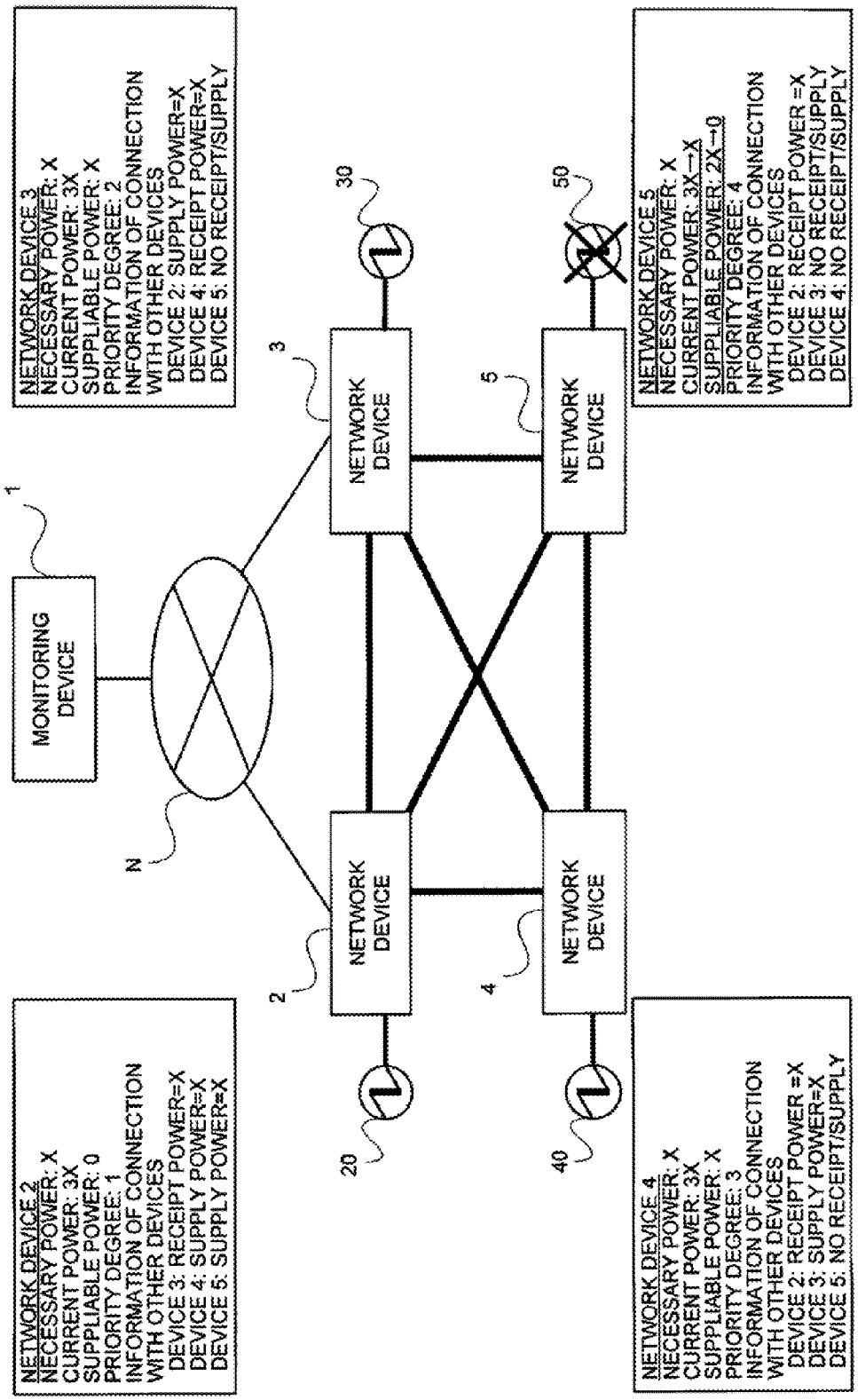

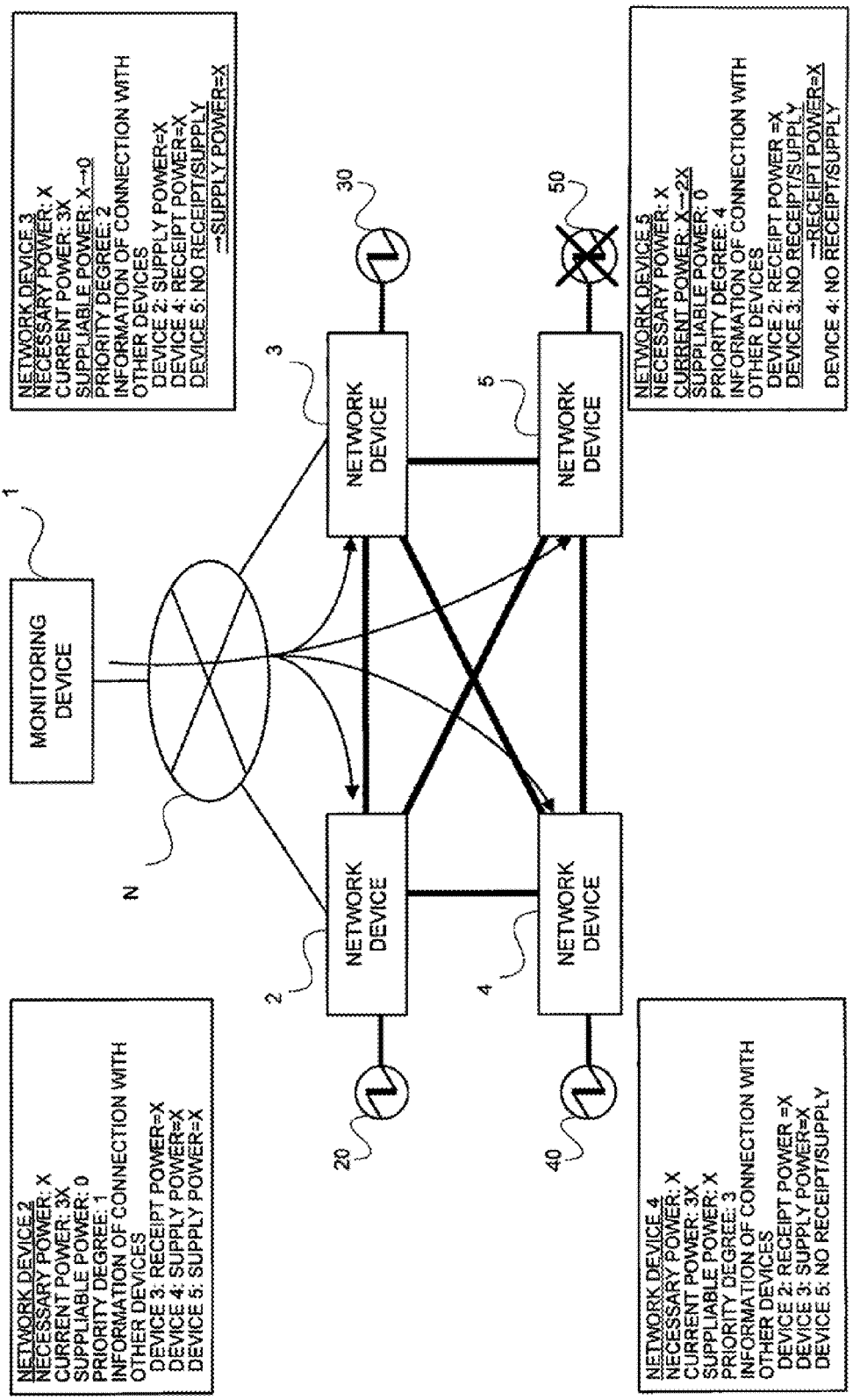

POWER CONTROL SYSTEM, POWER MONITORING DEVICE, RECORD MEDIUM HAVING POWER MONITORING PROGRAM RECORDED THEREIN, AND POWER MONITORING METHOD

INCORPORATION BY REFERENCE

This application is based upon and claims the benefit of priority from Japanese patent application No. 2008-144039, filed on Jun. 2, 2008, the disclosure of which is incorporated herein in its entirety by reference.

RELATED ART

The present invention relates to a power control system, and more particular to a power control system for controlling at least one of a power supply and a power receipt in devices connected to each other via a network, and demanding a power.

Nowadays, various kinds of electric appliances such as an information processing device and a household electronic have prevailed and are being used, and a high reliability is required for the electric appliances. In particular, a countermeasure at the time of a power source failure is of importance and a power source redundancy needs to be realized because it is essential to supply the power source to the electric appliance. As a configuration for realizing the foregoing power source redundancy, for example, there exists the configuration in which each device itself realizes the power source redundancy. Specifically, installing a plurality of the power sources into the device enables the power source redundancy to be realized.

Well, establishing the power source redundancy in the device itself, as described above, causes a problem that the device stops in the case that a failure has occurred in the power supply source. Further, it causes a problem that the power supply source cannot be comprehensively managed as the entirety of the system connected via the network because the power source is managed as a single device.

Further, in recent years, the technology has been developed of utilizing a network cable called PoE (Power Over Ethernet), thereby to supply the power to the devices as the network prevails. Utilizing this PoE technology, as disclosed in Patent document 1, allows the devices constituting the network system to supply the power to each other.

Patent document 1: JP-P20C7-88809A

However, in the technology disclosed in Patent document 1, the devices constituting the network exchange information with each other, and control the power. For this, each device needs to have a function of controlling the power. This could cause a configuration of each device to become complicated and further, the cost to be augmented. In addition hereto, the above technology causes a problem that a processing load of each device could be increased because each device needs to perform a power control process with a power control function, namely, a receipt/supply amount of the power or the like needs to be computed device by device.

SUMMARY OF THE INVENTION

The present invention has been accomplished in consideration of the foregoing problems, and an object thereof lies in a point of realizing the power source redundancy of each device constructing the network while suppressing the processing load of each device with a simplified configuration.

A power control system, being one aspect of the present invention for accomplishing such an object, includes monitored devices each of which can carry out at least one of a power supply to the other and a power receipt from the other via a network cable, and a power monitoring device connected to the above monitored devices via a network.

And, the above-mentioned monitored device includes: a device information providing unit for transmitting to the above-mentioned power monitoring device device information including necessary power information, being information indicative of a power necessary for operating each monitored device itself, and power status information indicative of a received power in the above-mentioned monitored device; and a power controller for controlling the power of its own device based upon the power control information transmitted from the above-mentioned power monitoring device.

In addition hereto, the above-mentioned power monitoring device includes a power configuration generator for: preparing power control information based upon device information including the above-mentioned necessary power information and the above-mentioned power status information; causing a power configuration information storage to store the prepared power control information mentioned above; and further transmitting the prepared power control information mentioned above to each monitored device.

Further, a power monitoring device, being another aspect of the present invention, includes a power configuration generator that: is connected, via a network, to monitored devices each of which can carry out at least one of a power supply to the other and a power receipt from the other via a network cable; prepares power control information based upon device information received from the above-mentioned monitored device; causes a power configuration information storage to store the prepared power control information mentioned above; and further transmits the prepared power control information mentioned above to each monitored device.

Further, a network device, being another aspect of the present invention, includes a power controller for: receiving power control information prepared based upon device information including necessary power information, being information indicative of a power necessary for operating each monitored device itself, and power status information indicative of a received power in each above-mentioned monitored device; and controlling the power of its own device based upon the received power control information mentioned above.

Further, a record medium having a program recorded therein, being another aspect of the present invention, is a record medium having a program recorded therein for causing a computer connected, via a network, to monitored devices each of which can carry out at least one of a power supply to the other and a power receipt from the other via a network cable to realize a power configuration calculating process of: preparing power control information based upon device information received from the above-mentioned monitored device; causing a power configuration information storage to store the prepared power control information mentioned above; and further transmitting the prepared power control information mentioned above to each monitored device.

Further, a power monitoring method, being another aspect of the present invention, includes: a step of preparing power control information based upon device information including necessary power information, being information indicative of a power necessary for operating each monitored device itself, and power status information indicative of a received power in each monitored device, which has been received from the monitored devices each of which can carry out at least one of a power supply to the other and a power receipt from the other via a network cable; a step of causing a power configuration information storage to store the prepared power control information mentioned above; and a power configuration calculating step of transmitting the prepared power control information mentioned above to each monitored device.

BRIEF DESCRIPTION OF THE DRAWINGS

This and other objects, features and advantages of the present invention will become more apparent upon a reading of the following detailed description and drawings, in which:

FIG. 7 is a view for explaining a situation of a power control in the power monitoring system;

FIG. 8 is a view for explaining a situation of a power control in the power monitoring system;

FIG. 9 is a view for explaining a situation of a power control in the power monitoring system; and FIG. 10 is a view for explaining a situation of a power control in the power monitoring system.

EXEMPLARY EMBODIMENTS

Figure 1:
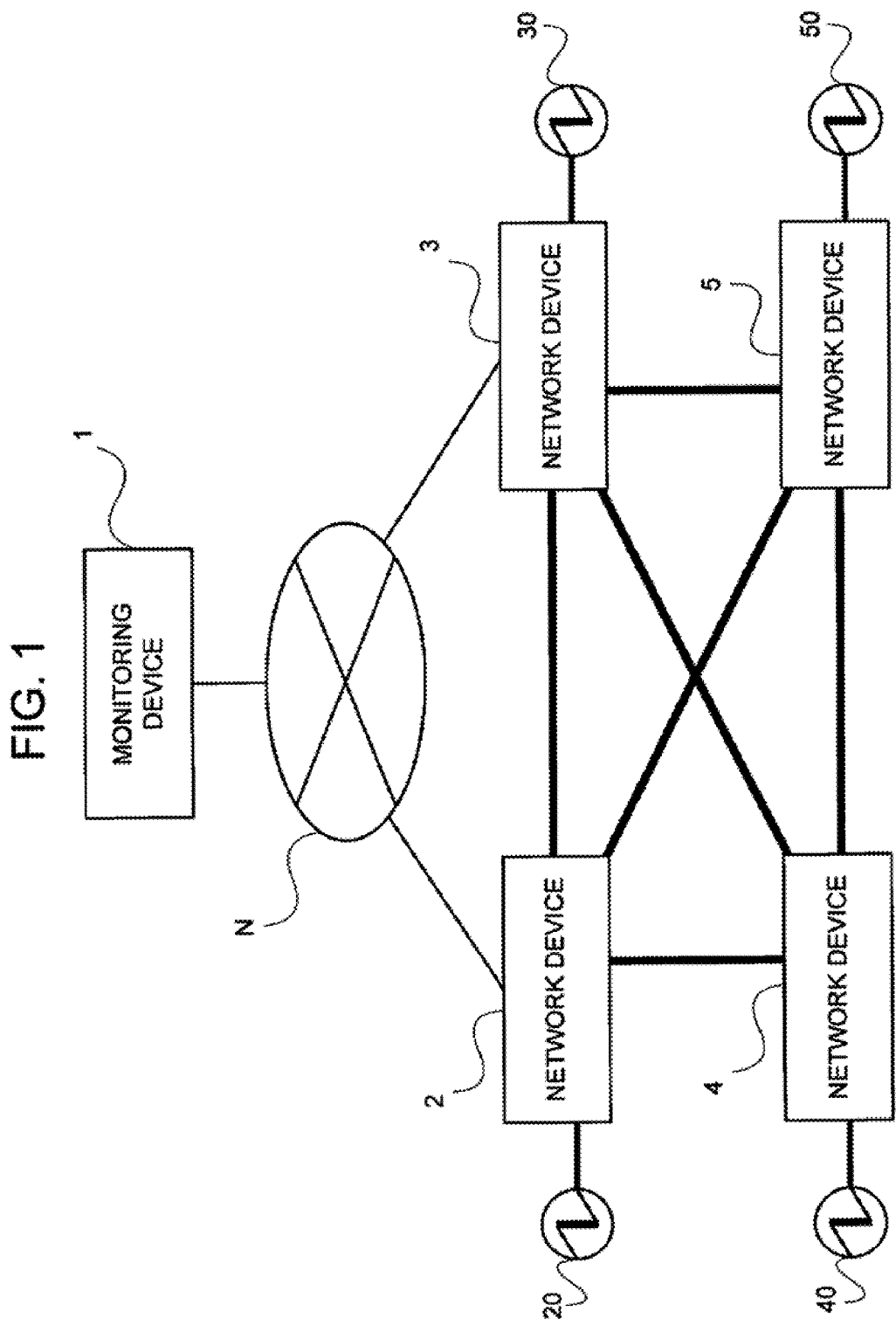
FIG. 1 is a block diagram illustrating an entire configuration of the power monitoring system.

A power control system, being one aspect of the present invention, includes monitored devices each of which can carry out at least one of a power supply to the other and a power receipt from the other via a network cable, and a power monitoring device connected to the above monitored devices via a network.

And, the above-mentioned monitored device includes a power controller for controlling the power of its own device based upon power control information transmitted from the above-mentioned power monitoring device.

In addition hereto, the above-mentioned power monitoring device includes a power configuration generator for: preparing power control information based upon device information including necessary power information, being information indicative of a power necessary for operating each monitored device itself, and power status information indicative of a received power in each monitored device; causing a power configuration information storage to store the prepared power control information mentioned above; and further transmitting the prepared power control information mentioned above to each monitored device.

In accordance with the present invention, at first, the monitored device transmits the device information including the above-mentioned necessary power information, and the above-mentioned power status information to the power monitoring device at an interval of a constant time. However, there is the case that the monitored device cannot transmit the device information due to some failure. Continuously, the power monitoring device prepares the power control information based upon the device information received from the monitored device. For example, the power monitoring device may prepare the power control information in the case that the device information has not been transmitted by the monitored device, or in the case that a change to at least one of the above-mentioned necessary power information and the above-mentioned power status information has occurred. Continuously, the power monitoring device causes the power configuration storage to store the prepared power control information in each monitored device, and further transmits it to each monitored device. The monitored device controls the power of its own device based upon the received power control information.

And, in the above-mentioned power control system, the above-mentioned power configuration generator monitors at least one of the necessary power information and the power status information, and prepares the power control information in the case that a change therein has occurred.

Further, in the above-mentioned power control system, the above-mentioned power configuration generator prepares the power control information in the case that at least the power status information, out of the necessary power information and the power status information, has not been transmitted from the above-mentioned monitored device.

Further, in the above-mentioned power control system, the above-mentioned device information includes the necessary power information, being information indicative of a power necessary for operating the above-mentioned monitored device itself, the power status information, being information indicative of a received power in the above-mentioned monitored device, and information indicative of a power that the above-mentioned monitored device can supply to other monitored devices and indicative of a connection relation of the above-mentioned monitored device with other monitored devices.

Further, in the above-mentioned power control system, the above-mentioned power configuration generator prepares the power control information so that the monitored device of which the receipt power exceeds the necessary power supplies the power to the monitored device of which the receipt power does not meet the necessary power.

Further, in the above-mentioned power control system, the above-mentioned power configuration generator prepares the power control information so that the monitored device of which the receipt power exceeds the necessary power supplies the power as far as a receivable power, being the power that the monitored device itself other than the above monitored device can receive, is reached.

Further, in the above-mentioned power control system, the above-mentioned power configuration generator receives priority degree information and prepares the power control information so that the power is preferredly supplied to the monitored device having a high priority degree based upon the priority degree information indicative of a priority degree of the power supply pre-set for each of the above-mentioned monitored devices.

Further, a power monitoring device, being another aspect of the present invention, includes a power configuration generator that: is connected, via a network, to monitored devices each of which can carry out at least one of a power supply to the other and a power receipt from the other via a network cable; prepares power control information based upon device information received from the above-mentioned monitored device, which includes necessary power information, being information indicative of a power necessary for operating each monitored device itself, and power status information indicative of a received power in each above-mentioned monitored device; causes a power configuration information storage to store the prepared power control information mentioned above, and further transmits the prepared power control information mentioned above to each above-mentioned monitored device.

And, in the above-mentioned power monitoring device, the above-mentioned power configuration generator monitors at least one of the necessary power information and the power status information, and prepares the power control information in the case that a change therein has occurred.

Further, in the above-mentioned power monitoring device, the above-mentioned power configuration generator prepares the power control information in the case that at least the power status information, out of the necessary power information and the power status information, has not been transmitted by the above-mentioned monitored device.

Further, a network device, being another aspect of the present invention, includes a power controller for: receiving power control information prepared based upon device information including necessary power information, being information indicative of a power necessary for operating each monitored device itself, and power status information indicative of a received power in each above-mentioned monitored device; and controlling the power of its own device based upon the received power control information mentioned above.

Further, a record medium having a program recorded therein, being another aspect of the present invention, is a record medium having a program recorded therein for causing a computer connected, via a network, to monitored devices each of which can carry out at least one of a power supply to the other and a power receipt from the other via a network cable to realize a power configuration calculating process of: preparing power control information based upon device information received from the above-mentioned monitored device, which includes necessary power information, being information indicative of a power necessary for operating each monitored device itself, and power status information indicative of a received power in each monitored device; causing a power configuration information storage to store the prepared power control information mentioned above; and further transmitting the prepared power control information mentioned above to each monitored device.

Further, in the above-mentioned record medium, the above-mentioned power configuration calculating process is a process of preparing the power control information so that the monitored device of which the receipt power exceeds the necessary power supplies the power to the monitored device of which the receipt power received from the above-mentioned monitored device does not meet the necessary power.

Further, in the above-mentioned record medium, the above-mentioned power configuration calculating process is a process of preparing the power control information so that the monitored device of which the receipt power exceeds the necessary power supplies the power as far as a receivable power, being the power that the monitored device itself other than the above monitored device can receive, is reached.

Further, a power monitoring method, being another aspect of the present invention, includes: a step of preparing power control information based upon device information including necessary power information, being information indicative of a power necessary for operating each monitored device itself, and power status information indicative of a received power in each monitored device, which has been received from the monitored devices each of which can carry out at least one of a power supply to the other and a power receipt from the other via a network cable; a step of causing a power configuration information storage to store the prepared power control information mentioned above; and a power configuration calculating step of transmitting the prepared power control information mentioned above to each monitored device.

Further, in the above-mentioned power monitoring method, the above-mentioned power configuration calculating step is a step of preparing the power control information so that the monitored device of which the receipt power exceeds the necessary power supplies the power to the monitored device of which the receipt power received from the above-mentioned monitored device does not meet the necessary power.

Further, in the above-mentioned power monitoring method, the above-mentioned power configuration calculating step is a step of preparing the power control information so that the monitored device of which the receipt power exceeds the necessary power supplies the power as far as a receivable power, being the power that the monitored device itself other than the above monitored device can receive, is reached.

Hereinafter, an example of the power control system, the power monitoring device, the record medium having a power monitoring program recorded therein, and the power monitoring method, which are related to the present invention, will be explained while a reference to FIG. 1 to FIG. 10 is made.

EXAMPLE

Figure 2:
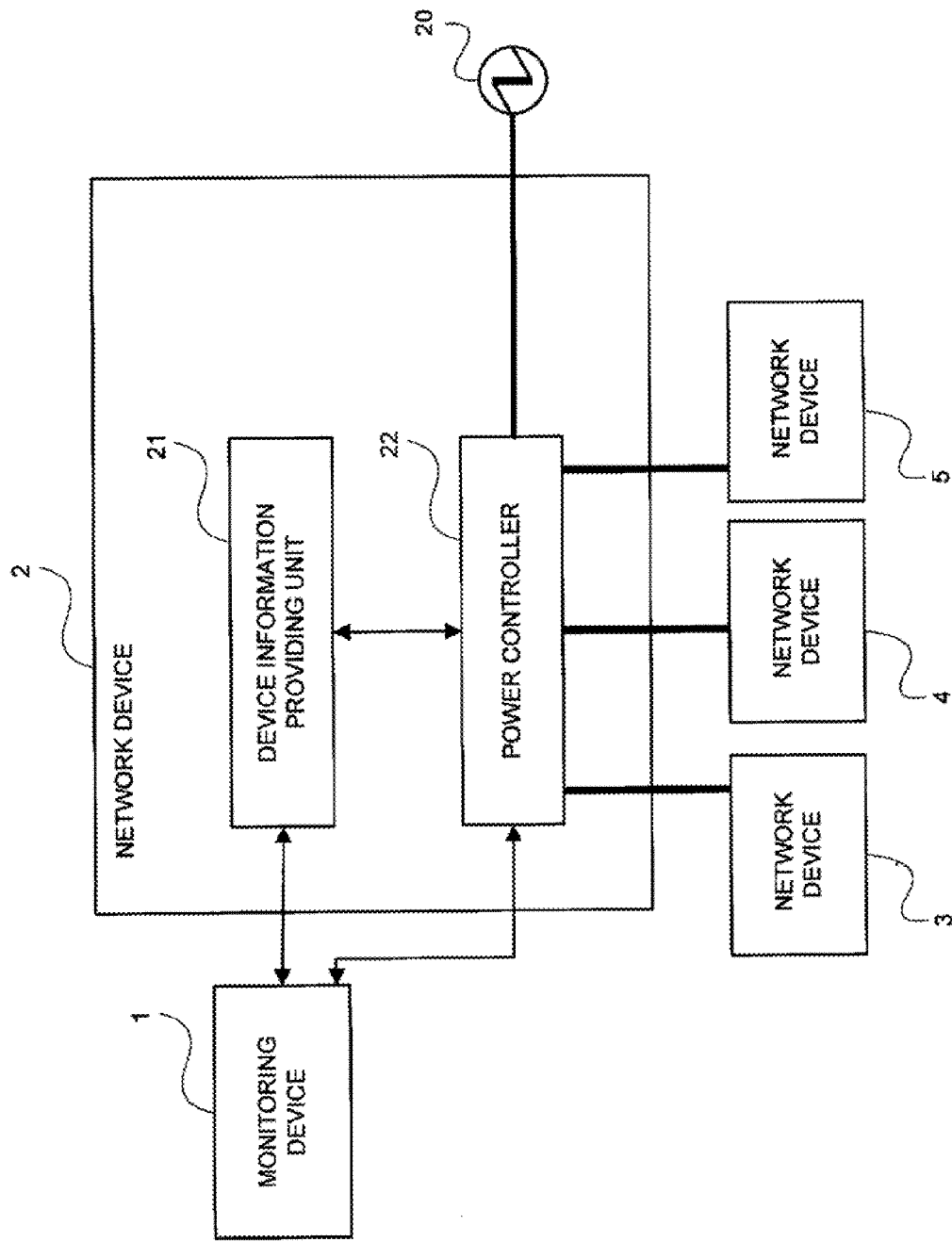
FIG. 2 is a functional block diagram illustrating of a configuration of the network device.
Figure 3:
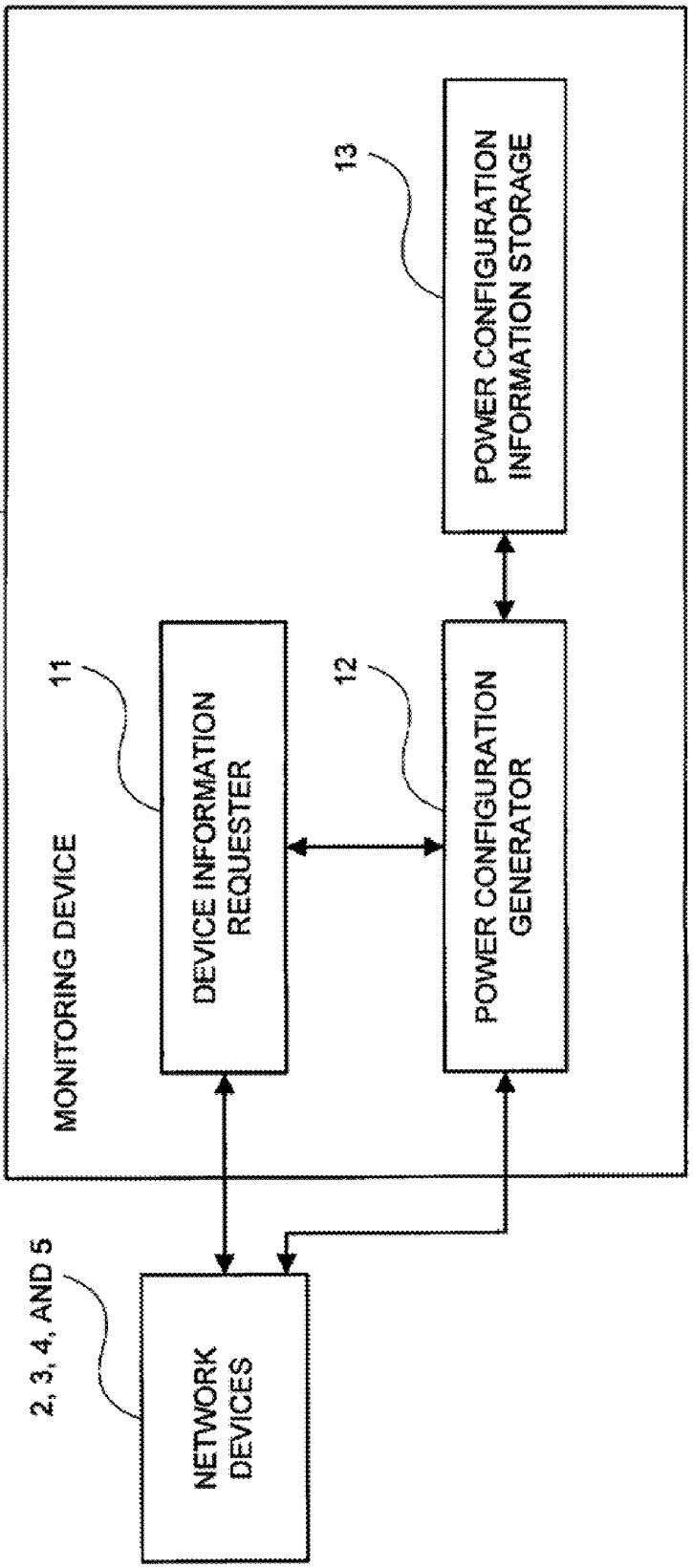
FIG. 3 is a functional block diagram illustrating a configuration of the monitoring device.
Figure 4:
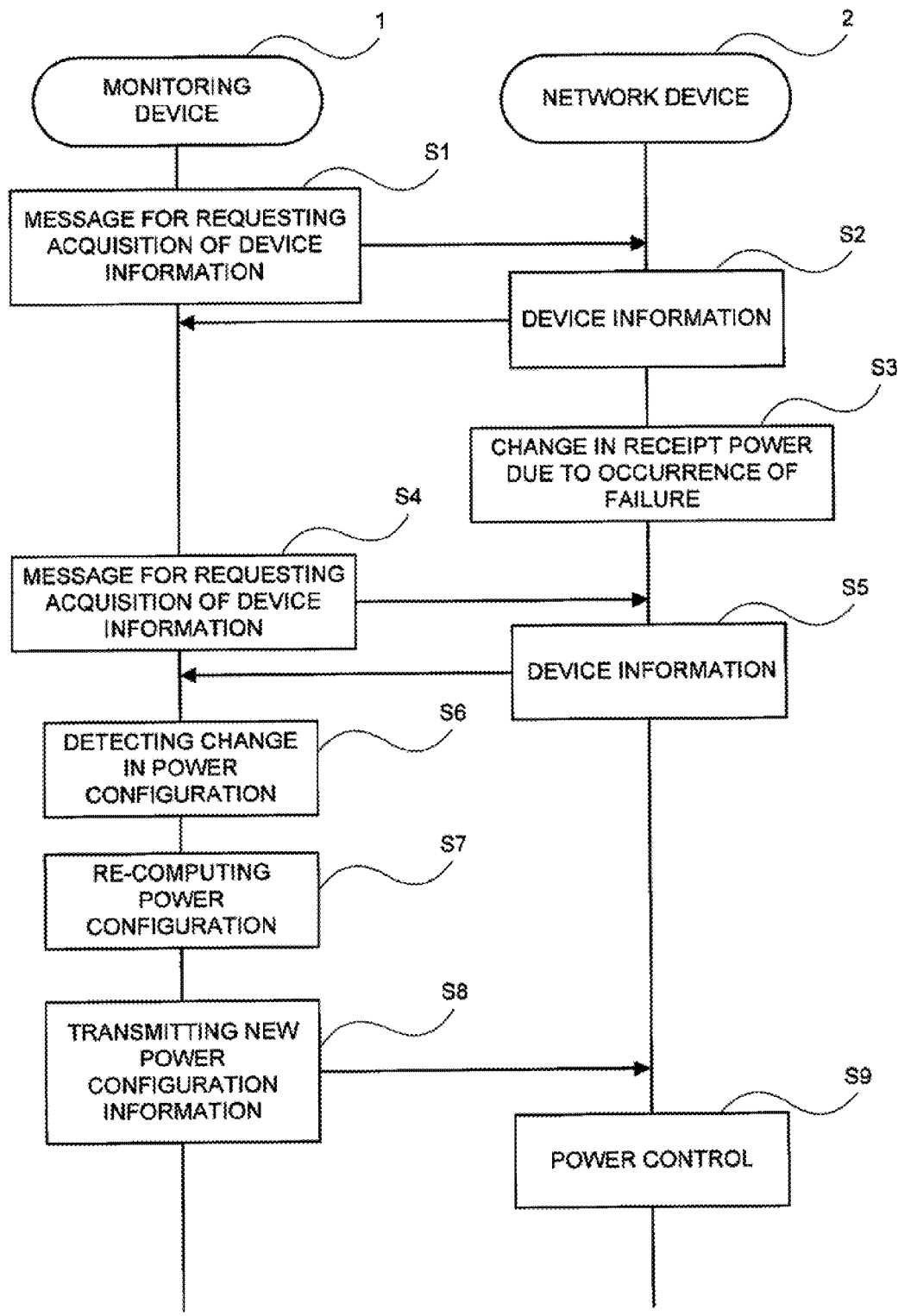
FIG. 4 is a sequence block illustrating an operation of the power monitoring system.
Figure 5:
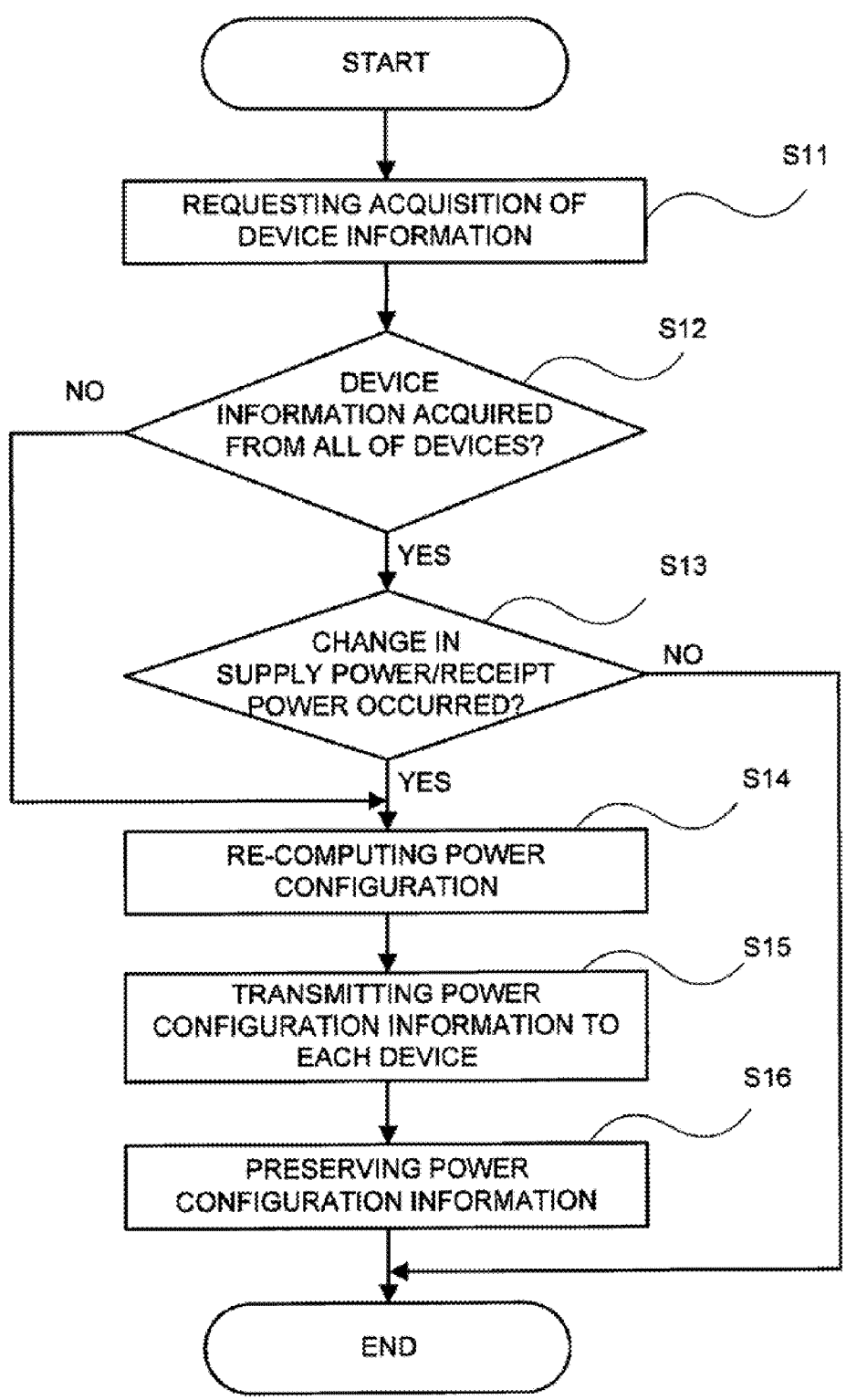
FIG. 5 is a flowchart illustrating an operation of the monitoring device.
Figure 6:
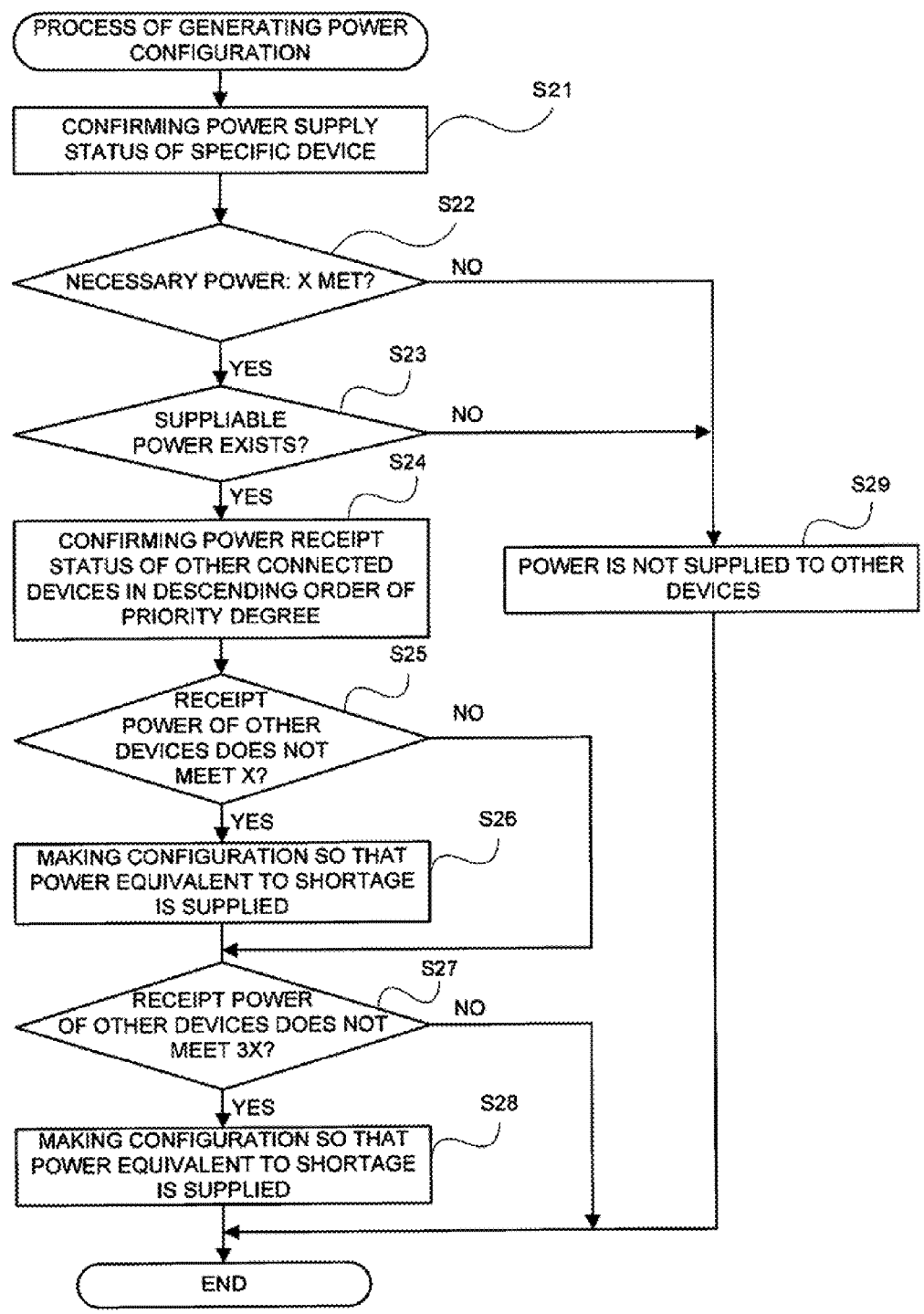
FIG. 6 is a flowchart illustrating an operation of the monitoring device, and particularly, illustrates an operation at the time of calculating a power configuration.

The example of the present invention will be explained by making a reference to FIG. 1 to FIG. 10. FIG. 1 is a block diagram illustrating an entire configuration of the power monitoring system. FIG. 2 is a functional block diagram illustrating of a configuration of the network device. FIG. 3 is a functional block diagram illustrating a configuration of the monitoring device. FIG. 4 is a sequence block illustrating an operation of the power monitoring system. Each of FIG. 5 and FIG. 6 is a flowchart illustrating an operation of the monitoring device. Each of FIG. 7 to FIG. 10 is a view for explaining a situation of a power control in the power monitoring system.

CONFIGURATION

The power control system in this example, as shown in FIG. 1, includes plural network devices 2, 3, 4, and 5 (monitored devices) connected to each other via a network N, and a monitoring device 1 (power monitoring device) for monitoring powers of these devices. Additionally, in this example, the case that the four network devices 2, 3, 4, and 5, each of which is a monitored device, have been installed will be explained; however the number of the above devices is not limited hereto.

And, the plural network devices 2, 3, 4, and 5, as shown by bold lines of FIG. 1, are connected to each other via a network cable. Further, the plural network devices 2, 3, 4, and 5 are configured so that they can make communication with each other. In addition hereto, each of the plural network devices 2, 3, 4, and 5 can carry out at least one of a power supply to the other and a power receipt from the other via the above-mentioned network cable. That is, each of the network devices 2, 3, 4, and 5 is configured so that it can supply/receive the power to/from the other by utilizing a Power of over Ethernet (hereinafter, referred to as "PoE") technology specified by IEEE 802.3af.

Herein, a configuration of the network devices 2, 3, 4, and 5 will be explained by making a reference to FIG. 2. Additionally, in FIG. 2, a configuration of the network device 2 is explained, and the detailed explanation of the network devices 3, 4, and 5 is omitted because they assume each configuration similar to that of the network device 2.

As shown in FIG. 2, the network device 2 includes a device information providing unit 21 and a power controller 22. Each of the device information providing unit 21 and the power controller 22 is constructed by incorporating a program into an arithmetic unit. Further, the network device 2 includes a power source device 20 for supplying the power to the above network device 2. Additionally, the network device 2 could be any electronic device, for example, a router and a personal computer.

And, the power controller 22 has a function of realizing the PoE technology. Specifically, the power controller 22 has a function of supplying the power to the other devices, for example, a PSE (Power Sourcing Equipment) function capable of supplying the power at a maximum of 15.4 W, and a function of receiving the power from the other devices, for example, a PD (Power Device) function capable of receiving the power at a maximum of 12.95 W. In addition hereto, the power controller 22 has a function of controlling the power of its own device based upon the configuration information being transmitted from the monitoring device 1 by employing the above-mentioned PSE function and PD function, as described later. For example, the configuration information has information stored therein for settling a configuration of the power of its own device being received/supplied from/to the other network devices, and power controller 22 takes a control based upon this configuration information so that the power being supplied from the power source device 20 connected to the network device 2 is utilized for its own device in some cases and is supplied to other network devices in some cases, and the power is received from other network devices in some cases. Additionally, a specific example of the power control based upon the configuration information will be explained at the moment of explaining an operation described below.

Further, upon receipt of a message for requesting the appliance information, being the device information, from the monitoring device 1 via the network N, as described later, the device information providing unit 21, responding to this message, extracts the device information of the network device 2 itself from its own device, and transmit it to the monitoring device 1. Additionally, the device information is at least each of information indicative of the power necessary for operating the network device 2 itself and power status information indicative of the status of the receipt/supply of the power in the network device 2 itself. The power status information is information including at least one of the current power information, being information indicative of the power that is currently being supplied to the network device 2 itself, and information indicative of the other network devices to/from which the network device 2 is supplying/receiving the power and indicative of the power of the power supply or the power receipt.

Specifically, the above-mentioned device information is information including the power necessary for operating the network device 2 itself ("necessary power"), the power that is currently being supplied to the network device 2 itself ("current power"), the "suppliable power" that the network device 2 itself can supply to the other network devices 3, 4, and 5, "the connection relation" of the network device 2 with the other network devices 3, 4, and 5, and "the priority degree".

Additionally, in this example, it is assumed that the above-mentioned "necessary power", which has been pre-set to the network device 2, is information stored in the above device.

Further, the "current power" is a power that is being supplied to the network device 2 from the power source device 20 or the devices connected to the network device 2, for example, the other network devices etc. Additionally, "a receivable power" indicative of the maximum power that each network device can receive is pre-set to each network device, and the receivable power becomes an upper-limit value of the "current power".

Further, the "suppliable power" is a surplus power of the above-mentioned necessary power, out of the power that is being supplied to the network device 2 from at least one of the power source device 20 and the other network devices. That is, the suppliable power is a power that the network device 2 can supply to the other network devices.

Further, "the connection relation" is information indicative of the other network devices to/from which the network device 2 is supplying/receiving the power and indicative of the power of the power supply or the power receipt. The power controller 22 of the network device 2 monitors the power control status, thereby enabling these items of the information associated with the power to be acquired.

Further, "the priority degree" is a priority degree of the power supply pre-set for each of the network devices 2, 3, 4, and 5, and stored in each device. This priority degree is set in such a manner that the bigger the numerical figure, the higher the priority degree. The configuration information of the network device is generated in the descending order of the priority degree so that "the current power" meets "the necessary power" and/or "the receivable power", as described later.

Next, the monitoring device 1 will be explained. The monitoring device 1 is connected to each of the network devices 2, 3, 4, and 5 via the network N. And, the monitoring device 1 has a function of one-dimensionally managing the power status of the network devices 2, 3, 4, and 5, namely, a redundancy configuration of the power so as to prevent each device from lacking the power.

And, the monitoring device 1, as shown in FIG. 3, includes a device information requester 11 and a power configuration generator 12. Each of the device information requester 11 and the power configuration generator 12 is constructed by incorporating a program into an arithmetic unit. Further, the storage installed in the monitoring device 1 includes a power configuration information storage 13.

Additionally, the above-mention device information and configuration information are stored in the power configuration storage 13. The details of the configuration information will be described later.

The device information requester 11 transmits a message for requesting device information to each of the network devices 2, 3, 4, and 5 via the network N at an interval of a constant time, and requests the device information including the information of the current power of each of the foregoing devices or the like. Continuously, the device information acquired from each of the network devices 2, 3, 4, and 5 responding to this request is transmitted to the power configuration generator 12. Further, in the case that no response has been made by at least one of the network devices 2, 3, 4, and 5 even though a pre-set time has elapsed after requesting of the network devices 2, 3, 4, and 5 the device information, the device information requester 11 notifies of the power configuration generator 12 its effect.

The power configuration generator 12 newly prepares configuration information indicative of the power configuration of the network devices 2, 3, 4, and 5 based upon at least the device information received from each network devices, out of the device information received from each network device, and the device information stored in the power configuration storage 13. And, the power configuration generator 12 transmits the newly prepared configuration information to each of the network devices 2, 3, 4, and 5. In addition hereto, the power configuration generator 12 causes the power configuration storage 13 to store the newly prepared configuration information.

Specifically, the above-mentioned configuration information is information including "the connection relation" of the network device 2 with the other network devices 3, 4, and 5.

The above-mentioned "connection relation" is information indicative of at least one of the information indicative of how much power the network device 2 is supplying and which other network devices are receiving, and the information indicative of how much power the network device 2 is receiving and which other network devices are supplying.

At the moment that each of the network devices 2, 3, 4, and 5 has been requested to transmit the device information by the device information requester 11, the power configuration generator 12 firstly investigates whether or not a response has been made to such a request within a constant time. And, in the case that no response has been made by any of the network devices 2, 3, 4, and 5, the power configuration generator 12 prepares newly the configuration information.

Further, in the case that the device information requester 11 has acquired the device information from each of the network devices 2, 3, 4, and 5, as described above, the power configuration generator 12 compares the above device information with the device information stored in the power configuration storage 13, and investigates whether or not a change in the power configuration of each of the network devices 2, 3, 4, and 5 has occurred. Herein, the device information stored in the power configuration storage 13 is configuration information previously transmitted to each of the network devices 2, 3, 4, and 5. That is, each of the network devices 2, 3, 4, and 5 is due to control the power based upon the device information stored in the power configuration storage 13. Thus, it can be determined that a change in the power configuration has occurred when the received device information of the network devices 2, 3, 4, and 5 differs from the device information stored in the power configuration storage 13. In such a manner, when it is determined that a change in the power configuration of the network devices 2, 3, 4, and 5 has occurred, the power configuration generator 12 prepares newly the configuration information.

As mentioned above, the power configuration generator 12 prepares newly the configuration information based upon at least the device information received from each network device, out of the device information received from each network device and the device information stored in the power configuration storage 13. Additionally, herein, with the power required for the network device 2 defined to be X, the maximum of the power that is supplied to the network device 2 from the power source device 20 connected to each network device, or the like is defined to be X. And, the remaining power is used for the PoE. That is, the remaining power is utilized for the power supply to the other network devices. Further, with the power required for the network device 2 defined to be X, the maximum of the power that the network device 2 supplies to the other network devices via the PoE is defined to be X. In addition hereto, with the power required for its own device defined to be X, the minimum and the maximum of the power that is supplied to each network device from the other network devices, that is, the power (hereinafter referred to as a receivable power) that can be received from the other devices is defined to be X and 3X, respectively. That is, the power of the minimum=X is supplied to each network device in the first place, and the remaining surplus power is allotted to the connectable devices in the priority degree order as far as the maximum=3X is reached.

Additionally, it is assumed that the devices in the network have a different priority degree.

And, the new configuration information is prepared by the power configuration generator 12, for example, as described below. At first, the power configuration generator 12 pays an attention to a specific network device, and confirms the power status of the above device. Continuously, the power configuration generator 12 confirms whether or not the above network device can secure the power: X necessary for operation with its own device. The power configuration generator 12 prepares the configuration information so that the above network device supplies to the other devices the surplus power coming from the power source device, as described later, when it can secure the necessary power: X. Additionally, when the network device is receiving the receivable power: 3X established as a value larger than the necessary power: X, and yet there exists the power suppliable to the other devices, being a surplus power being supplied from the power source device etc., it may supply the power to the other devices. On the other hand, the network device does not supply the power to the other devices when it cannot secure the necessary power: X.

Continuously, when it has been determined that the network device has the surplus power, the power configuration generator 12 confirms the power receipt status of the other devices connected to its own device in the descending order of the priority degree. And, when the power receipt status of the other devices having a high priority degree does not meet the necessary power: X, the power configuration generator 12 prepares the configuration information so that the network device supplies the power equivalent to a shortage of the above X to the above other devices having a high priority degree. And, still, in the case that there exists the surplus power, when the power receipt status of the other devices having a high priority degree does not meet the receivable power: 3X, the network device supplies the power equivalent to a shortage of the above 3X to the above other devices having a high priority degree. And, the above-mentioned calculating process is repeated for each network device.

As mentioned above, the power configuration generator 12 firstly prepares the configuration information so that the power supply or the power receipt of the power are carried out via the network cable among the network devices so as to allow the current power of each network device to meet the necessary power in the descending order of the priority degree. And, still, when the power is in excess, the power configuration generator 12 prepares the configuration information so that the power supply or the power receipt of the power are carried out via the network cable among the network devices so as to allow the current power of the network device to meet the receivable power in the descending order of the priority degree.

And, the power configuration generator 12 prepares the new configuration information, and causes the power configuration storage 13 to store the above configuration information. In addition hereto, it transmits the above configuration information to each of the network devices 2, 3, 4, and 5.

Additionally, in this embodiment, the configuration in which the device information requester 11 transmitted a message for requesting the each device information to each of the network devices 2, 3, 4, and 5 via the network N at an interval of a constant time, and requested the device information including the information of the power that was being supplied to each of the foregoing devices was employed for explanation; however the configuration is not limited hereto, and the configuration may be employed in which an device information collector is used instead of the device information requester 11, and the device information collector collects the each device information from each of the network devices 2, 3, 4, and 5 at an interval of a constant time.

Further, in this embodiment, the configuration in which the power configuration generator 12 compared the device information acquired from each network device with the device information stored in the power configuration storage 13, and prepared the new configuration information when a change in the power configuration of each network device occurred was employed for explanation; however the configuration is not limited hereto, and the power configuration generator 12 may be adapted so as to employ at least the device information transmitted from each network device, thereby to prepare the configuration information.

Additionally, in this embodiment, the configuration in which the monitored device transmitted the information of the necessary power and the current power of its own device to the monitoring device was employed for explanation; however the configuration is not limited hereto. When no change in the necessary power of each monitored device occurs, the monitored device may transmit the information of the current power of its own device to the monitoring device by causing the monitoring device to pre-store the necessary power of each monitored device. On the other hand, when a change in the necessary power of each monitored device occurs, the monitored device may transmit the information of the necessary power and the current power of its own device to the monitoring device.

Additionally, in this embodiment, the configuration in which the monitored device transmitted the priority degree to the monitoring device was employed for explanation; however the configuration is not limited hereto. The monitoring device may be caused to pre-store the priority degree of each monitored device. Further, in this embodiment, the form in which each of the monitoring device and the monitored device existed separately was employed for explanation; however the form is not limited hereto. The device having a function of both of the monitoring device and the monitored device may be employed.

OPERATION

Next, an operation of the power control system configured above will be explained by making a reference to FIG. 4 to FIG. 10. Additionally, it is assumed that the power configuration of each of the network devices 2, 3, 4, and 5, namely, the necessary power, the current power, the suppliable power, the priority degree of its own device, and the information of the connection of its own device to the other devices are ones shown in FIG. 7. That is, the configuration information of each network device is mentioned below.
Network device 2
Necessary power: X
Current power: 3X
Suppliable power: 0
Priority degree 1
Configuration information with the other devices: device 3: receipt power=X,
device 4: supply power=X,
device 5: supply power=X.
Network device 3
Necessary power: X
Current power: 3X
Suppliable power: X
Priority degree 2
Configuration information with the other devices: device 2: supply power=X,
device 4: receipt power=X,
device 5: no receipt/supply
Network device 4
Necessary power: X
Current power: 3X
Suppliable power: X
Priority degree: 3
Configuration information with the other devices: device 2: receipt power=X,
device 3: supply power=X,
device 5: no receipt/supply
Network device 5
Necessary power: X
Current power: 3X
Suppliable power: 2X
Priority degree: 4
Configuration information with the other devices: device 2: receipt power=X,
device 3: no receipt/supply,
device 4: no receipt/supply And, the monitoring device 1 causes the power configuration storage 13 to store the above-mentioned device information and the above-mentioned information indicative of the power configuration with the other devices.

And, the monitoring device 1 transmits a message for requesting the device information to each network device at an interval of a constant time as shown by solid-line arrows of FIG. 8 (step S1 of FIG. 4 and step S11 of FIG. 5). Then, each network device collects the necessary power, the current power, the suppliable power and the priority degree of its own device, and transmits them to the monitoring device 1 as shown by dotted-line arrows of FIG. 8 (step S2 of FIG. 4). This enables the monitoring device 1 to grasp the power configuration of each of the network devices 2, 3, 4, and 5. When a responses of the device information has been made by all of the network devices 2, 3, 4, and 5 (yes in a step S12 of FIG. 5), and further, as a result of a comparison of the device information received from each network device and the device information stored in the power configuration storage 13, no change in the power configuration of each of the network devices 2, 3, 4, and 5 (no in a step S13 of FIG. 5) has occurred, the monitoring device 1 does not prepare the new configuration information.

Now think about the case that, thereafter, a failure has occurred in the power source device 50 of the network device 5, as shown by a cross mark of FIG. 9. Then, a change in the power configuration of the network device 5, namely, a change in the device information occurs (step S3 of FIG. 4). Herein, it is assumed that the current power of the network device 5 has decreased from 3X to X, and further, the suppliable power has varied from 3X to 0. Additionally, when the network device 5 is supplying the power to the other devices, it follows the power configuration as well of the other network devices varies.

The monitoring device 1 transmits a message for requesting the device information to each network device at an interval of a constant time similarly to the foregoing (step S4 of FIG. 4 and step S11 of FIG. 5). Then, each network device collects the necessary power, the current power, the suppliable power, and the priority degree of its own device, and transmits them to the monitoring device 1 (step S5 of FIG. 4). It is assumed that it has been detected that a responses of the device information has been made by all of the network devices 2, 3, 4, and 5 (yes in a step S12 of FIG. 5), and as a result of a comparison of the device information received from each network device and the device information stored in the power configuration storage 13, a change in the power configuration of the network device 5 has occurred (step S6 of FIG. 4 and yes in a step S13 of FIG. 5). In this case, the monitoring device 1 prepares the new configuration information (step S7 of FIG. 4 and step S14 of FIG. 5). Additionally, the process of preparing the new configuration information is performed also in the case that the device information has not been transmitted by any of the network devices (no in a step S12 of FIG. 5).

In the foregoing example, the monitoring device 1 prepares the configuration information of each network device so that "the current power" of the network device 5 is recovered to the necessary power or the receivable power because a change in the power configuration of the network device 5 has occurred, and further, the priority degree of the above network device 5, which is "4", is highest.

Specifically, the monitoring device 1 pays an attention to each of the network devices 2, 3, 4, and 5, and confirms the power status thereof (step S21 of FIG. 6). The monitoring device 1 investigates whether or not the network devices 2, 3, 4, and 5 have the suppliable power (step S23 of FIG. 6) because the current powers of all of them meet the necessary power: X (yes in a step S22 of FIG. 6). Each of the network devices 2 and the network device 5 does not supply the power to the other devices (step S29 of FIG. 6) because the suppliable power thereof is zero (no in a step S23 of FIG. 6). On the other hand, each of the network device 3 and the network device 4 becomes a target network device that supplies the power to the other network devices because it has the suppliable power. Additionally, the device as well of which the current power does not meet the necessary power: X (no in a step S22 of FIG. 6), does not supply the power to the other devices (step S29 of FIG. 6).

Continuously, the monitoring device 1 confirms the power status of the other network devices 2 and 5 connected to the above-mentioned network devices 3 and 4. At this time, the monitoring device 1 investigates the power status of the network device 5 having a priority degree 4, being a highest priority degree, because the power status is confirmed in the descending order of the priority degree. And, when the receipt power of this network device 5 does not meet the necessary power: X (yes in a step S25 of FIG. 6), the monitoring device 1 prepares the configuration information so that at least one of the network devices 3 and 4 supplies the power equivalent to a shortage (step S26 of FIG. 6). In this example, the power of the network device 5 meets the necessary power X (no in a step S25 of FIG. 6). However, the monitoring device 1 prepares the configuration information so that at least one of the network devices 3 and 4 supplies the power equivalent to a shortage to the network device 5 (step S28 of FIG. 6) until the current power thereof becomes 3X because the receipt power of this network device 5, namely, the current power: X does not meet the receivable power: 3X (yes in a step S27 of FIG. 6). In this case, the monitoring device 1 prepares the configuration information so that the network device 3 of which the priority degree is lower than that of the network devices 4 supplies the power: X to the network device 5 (see FIG. 10).

Thereafter, the monitoring device 1 transmits the configuration information newly prepared for each device to each of the network devices 2, 3, 4, and 5 as shown by solid-line arrows of FIG. 10 (step S8 of FIG. 4 and step S15 of FIG. 5). In addition hereto, the monitoring device 1 causes the power configuration storage 13 to store the newly prepared configuration information as configuration information (step S16 of FIG. 5).

And, each of the network devices 2, 3, 4, and 5 having received the new configuration information from the monitoring device 1 controls the power according to such configuration information (step S9 of FIG. 4). That is, in this example, as shown in FIG. 10, the network device 3 supplies (X) the power to the network device 5, and the network device 5 receives (X) such a supply power. With this, the current power of the network device 5 having a high priority degree becomes 2X, and the redundancy of the power is secured.

Additionally, in the foregoing, an example of newly preparing the power configuration in the case that the device information has been transmitted from all of the network devices 2, 3, 4, and 5, and yet a change in the power configuration occurred was explained; however the monitoring device 1 may prepare the configuration information in the case that no response has been made by any of the network devices 2, 3, 4, and 5. In this case, the monitoring device 1 prepares the new configuration information based upon just-before configuration information stored in the power configuration storage 13 of the monitoring device 1. For example, no response of the device information has been made by the network device 2, it is determined that the above network device 2 has failed, and the power configuration is re-computed with other network devices 3, 4, and 5. Then, a change as well in the current power of the other network devices that so far have received the power from the network device 2 can be predicted, and the new configuration information is prepared in consideration of such a prediction.

Further, when a response has been made by any of the network devices 2, 3, 4, and 5, the configuration information may be prepared. In this case, the configuration information is prepared based upon the device information received from each of the network devices 2, 3, 4, and 5.

As mentioned above, the present invention makes it possible to collectively monitor the power of the network device with the monitoring device, and to realize the power source redundancy of the network device with a simplified configuration. And, with this, the network device itself does not need to manage the power supply and the power receipt of the power, whereby not only alleviation of the processing load of the above network device is realized, but also an appropriate operation of the network device is secured.

The present invention, which is configured as described above, has an excellent effect that the power source redundancy of the monitored device can be realized, yet the alleviation of the processing load of the above monitored device can be realized with the simplified configuration, and an appropriate operation of the monitored device can be secured.

A first aspect of the present invention, which is a power control system, includes: monitored devices each of which can carry out at least one of a power supply to the other; and a power receipt from the other via a network cable, and a power monitoring device connected to the above monitored devices via a network, wherein the foregoing monitored device includes: a device information providing unit for transmitting device information including at least each of information indicative of the power necessary for operating its own device and information indicative of a receipt/supply status of the power in its own device to the foregoing power monitoring device responding to a request by the foregoing power monitoring device; and a power controller for taking a power control in its own device based upon supply power/receipt power configuration information indicative of a supply power/receipt power configuration among the monitored devices, which has been generated and transmitted by the foregoing power monitoring device, and wherein the foregoing power monitoring device includes: a supply power/receipt power configuration storage for storing the foregoing supply power/receipt power configuration information; a device information requester for requesting of the foregoing monitored device the foregoing device information, and receiving a response to this request from the foregoing monitored device; and a supply power/receipt power configuration generator for calculating the foregoing new supply power/receipt power configuration information based upon the response to the request of the foregoing device information by the foregoing device information requester from the foregoing monitored device, and the foregoing supply power/receipt power configuration information stored in the foregoing supply power/receipt power configuration storage, transmitting it to the foregoing monitoring device, and causing the foregoing supply power/receipt power configuration storage to store it.

A second aspect of the present invention is characterized in that, when the foregoing device information requester has requested of the foregoing monitored device the foregoing device information in the above-mentioned aspect, the foregoing supply power/receipt power configuration generator that the foregoing power monitoring device includes goes into operation based upon the foregoing configuration information transmitted from the above monitored device and the foregoing supply power/receipt power configuration information stored in the foregoing supply power/receipt power configuration storage in the case that a change in the power that the foregoing monitored device supplies/receives has occurred.

A third aspect of the present invention is characterized in that, in the above-mentioned aspect, the foregoing supply power/receipt power configuration generator goes into operation in the case that, after the foregoing device information requestor has requested of the foregoing monitored device the foregoing device information, no response has been made by the above monitored device.

A fourth aspect of the present invention is characterized in that, in the above-mentioned aspect, the foregoing device information includes information indicative of the power necessary for operating the foregoing monitored device, the power that is currently being supplied to the foregoing monitored device, the power that the foregoing monitored device can supply to the other monitored devices, and the connection relation of the foregoing monitored device with the other monitored devices.

A fifth aspect of the present invention is characterized in that, in the above-mentioned aspect, the foregoing supply power/receipt power configuration generator generates the foregoing supply power/receipt power configuration information so that the foregoing monitored device of which the current power meets the necessary power supplies the suppliable power to the foregoing other monitored devices connected to the above monitored device, of which the received meets the necessary power.

A sixth aspect of the present invention is characterized in that, in the above-mentioned aspect, the foregoing supply power/receipt power configuration generator generates the foregoing supply power/receipt power configuration information so that the foregoing monitored device of which the current power meets the necessary power supplies the suppliable power to the foregoing other monitored devices as far as the receivable power pre-established as a value higher than the necessary power is reached.

A seventh aspect of the present invention is characterized in that, in the above-mentioned aspect, the foregoing device information includes priority degree information indicative of a priority degree of the power supply pre-set for each of the foregoing monitored devices, and the foregoing supply power/receipt power configuration generator generates the foregoing supply power/receipt power configuration information so that the power is preferredly supplied to the foregoing other monitored devices having a high priority degree based upon the foregoing priority degree information.

An eighth aspect of the present invention is a power monitoring device including: a supply power/receipt power configuration storage that, via a network, is connected to monitored devices each of which can carry out at least one of a power supply to the other and a power receipt from the other via a network cable, and stores supply power/receipt power configuration information indicative of a supply power/receipt power configuration among the foregoing monitored devices; a device information requester for requesting of the foregoing monitored device device information including at least each of information indicative of the power necessary for operating the above monitored device and information indicative of a receipt/supply status of the power in the above monitored device, and receiving a response to this request from the foregoing monitored device; and a supply power/receipt power configuration generator for generating the foregoing new supply power/receipt power configuration information based upon the response to the request of the foregoing device information by the foregoing device information requester from the foregoing monitored device, and the foregoing supply power/receipt power configuration information stored in the foregoing supply power/receipt power configuration storage, transmitting it to the above monitored device so that the foregoing monitored device takes a power control based upon this generated supply power/receipt power configuration information, and causing the foregoing supply power/receipt power configuration storage to store it.

A ninth aspect of the present invention is characterized in that, when the foregoing device information requester has requested of the foregoing monitored device the foregoing device information in the above-mentioned aspect, the foregoing supply power/receipt power configuration generator goes into operation based upon the foregoing configuration information transmitted from the above monitored device and the foregoing supply power/receipt power configuration information stored in the foregoing supply power/receipt power configuration storage in the case that a change in the power that the foregoing monitored device supplies/receives has occurred.

A tenth aspect of the present invention is characterized in that, in the above-mentioned aspect, the foregoing supply power/receipt power configuration generator goes into operation in the case that, after the foregoing device information requester has requested of the foregoing monitored device the foregoing device information, no response has been made by the above monitored device.

An eleventh aspect of the present invention is a program for causing a computer, via a network, connected to monitored devices each of which can carry out at least one of a power supply to the other and a power receipt from the other via a network cable, to realize: a device information requester for requesting of the foregoing monitored device device information including at least each of information indicative of the power necessary for operating the above monitored device and information indicative of a receipt/supply status of the power in the above monitored device, and receiving a response to this request from the foregoing monitored device; and a supply power/receipt power configuration generator for calculating the foregoing new supply power/receipt power configuration information based upon a response to the request of the foregoing device information by the foregoing device information requester from the foregoing monitored device, and supply power/receipt power configuration information indicative of the stored supply power/receipt power configuration among the foregoing monitored devices, transmitting this generated new supply power/receipt power configuration information to the above monitored device so that the foregoing monitored device takes a power control based upon the above new supply power/receipt power configuration information, and storing the above new supply power/receipt power configuration information.

A twelfth aspect of the present invention is characterized in that, when the foregoing device information requester has requested of the foregoing monitored device the foregoing device information in the above-mentioned aspect, the foregoing supply power/receipt power configuration generator goes into operation based upon the foregoing configuration information transmitted from the above monitored device and the foregoing stored supply power/receipt power configuration information in the case that a change in the power that the foregoing monitored device supplies/receives has occurred.

A thirteenth aspect of the present invention is characterized in that, in the above-mentioned aspect, the foregoing supply power/receipt power configuration generator goes into operation in the case that, after the foregoing device information requester has requested of the foregoing monitored device the foregoing device information, no response has been made by the above monitored device.

A fourteenth aspect of the present invention is a power monitoring method including: a device information requesting step of requesting of monitored devices, each of which can carry out at least one of a power supply to the other and a power receipt to the other via a network cable, device information including at least each of information indicative of the power necessary for operating the above monitored device and information indicative of a receipt/supply status of the power in the above monitored device, and receiving a response to this request from the foregoing monitored device; and a supply power/receipt power configuration calculating step of calculating the foregoing new supply power/receipt power configuration information based upon a response to the request of the foregoing device information from the foregoing monitored device in the foregoing device information requesting step, and supply power/receipt power configuration information indicative of the stored supply power/receipt power configuration among the foregoing monitored devices, transmitting this generated new supply power/receipt power configuration information to the above monitored device so that the foregoing monitored device takes a power control based upon the above new supply power/receipt power configuration information, and storing the above new supply power/receipt power configuration information.

A fifteenth aspect of the present invention is characterized in that, when the foregoing device information has been requested of the foregoing monitored device in the foregoing device information requesting step in the above-mentioned aspect, the foregoing supply power/receipt power configuration calculating step goes into operation based upon the foregoing configuration information transmitted from the above monitored device and the foregoing stored supply power/receipt power configuration information in the case that a change in the power that the foregoing monitored device supplies/receives has occurred.

A sixteenth aspect of the present invention is characterized in that, in the above-mentioned aspect, the foregoing supply power/receipt power configuration calculating step goes into operation in the case that, after the foregoing device information has been requested of the foregoing monitored device in the foregoing device information requesting step, no response has been made by the above monitored device.

The present invention, which can be utilized for managing the power source of the system provided with the network devices that can receive/supply the power from/to each other via the network cable, has industrial applicability.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A power control system comprising a monitoring device and a plurality of monitored devices including a given monitored device and one or more other monitored devices:
   wherein said monitoring device has a power configuration generator for preparing power control information based upon device information including necessary power information, being information indicative of a power necessary for operating each said monitored device itself, and power status information indicative of a received power in each said monitored device, causing a power configuration information storage to store said prepared power control information, and further transmitting said prepared power control information to each said monitored device; and
   wherein each said monitored device has a power controller for controlling the power of its own device based upon said power control information transmitted by said monitoring device,
   wherein said given monitored device is connected to said other monitored devices via one or more network cables, and said given monitored device directly supplies power to said other monitored devices via said network cables, such that said prepared power control information is transmitted to said other monitored devices through said given monitored device via said network cables.

2. A power control system according to claim 1, wherein said monitoring device prepares the power control information when a change in said device information has occurred.

3. A power control system according to claim 2, wherein said monitoring device prepares the power control information when said device information is not transmitted by the monitored device.

4. A power control system according to claim 3, wherein said monitoring device prepares the power control information so that the monitored device of which the current power exceeds the necessary power supplies the power to the monitored device of which said received power does not meet the necessary power.

5. A power control system according to claim 3, wherein said monitoring device prepares the power control information so that the monitored device of which said received power exceeds the necessary power supplies the power as far as maximum of capability for receiving power of the monitored device itself other than the above monitored device.

6. A power control system according to claim 2, wherein said monitoring device prepares the power control information so that the monitored device of which the current power exceeds the necessary power supplies the power to the monitored device of which said received power does not meet the necessary power.

7. A power control system according to claim 2, wherein said monitoring device prepares the power control information so that the monitored device of which said received power exceeds the necessary power supplies the power as far as maximum of capability for receiving power of the monitored device itself other than the above monitored device.

8. A power control system according to claim 1, wherein said monitoring device prepares the power control information so that the monitored device of which the current power exceeds the necessary power supplies the power to the monitored device of which said received power does not meet the necessary power.

9. A power control system according to claim 8, wherein said monitoring device prepares the power control information so that the monitored device of which said received power exceeds the necessary power supplies the power as far as maximum of capability for receiving power of the monitored device itself other than the above monitored device.

10. A power control system according to claim 1, wherein said monitoring device prepares the power control information so that the monitored device of which said received power exceeds the necessary power supplies the power as far as maximum of capability for receiving power of the monitored device itself other than the above monitored device.

11. A power control system according to claim 1, wherein said monitoring device preferredly supplies the power to the monitored device having a high priority degree based upon priority degree information indicative of a priority degree of the power supply pre-set for each of said monitored devices.

12. A power monitoring method performed in relation to a monitoring device and a plurality of monitored devices including a given monitored device and one or more other monitored devices, comprising:
   a step of preparing power control information based upon device information including necessary power information, being information indicative of a power necessary for operating each said monitored device itself, and power status information indicative of a received power in each said monitored device;
   a step of causing a power configuration information storage to store said prepared power control information; and
   a power configuration calculating step of transmitting said prepared power control information to each said monitored device,
   wherein said given monitored device is connected to said other monitored devices via one or more network cables, and said given monitored device directly supplies power to said other monitored devices via said network cables, such that said prepared power control information is transmitted to said other monitored devices through said given monitored device via said network cables.

13. A power monitoring method according to claim 12, wherein said power configuration calculating step is a step of preparing the power control information so that the monitored device of which the current power exceeds the necessary power supplies the power to the monitored device of which said received power does not meet the necessary power.

14. A power monitoring method according to claim 12, wherein said power configuration calculating step is a step of preparing the power control information so that the monitored device of which said received exceeds the necessary power supplies the power as far as maximum of capability for receiving power of the monitored device itself other than the above monitored device.

15. A non-transitory recording medium having a program recorded therein for causing a monitoring device to execute a power configuration calculating process in relation to a monitoring device and a plurality of monitored devices including a given monitored device and one or more other monitored devices of:
   preparing power control information based upon device information including necessary power information, being information indicative of a power necessary for operating each said monitored device itself, and power status information indicative of a received power in each said monitored device;
   causing a power configuration information storage to store said prepared power control information; and
   transmitting said prepared power control information to each said monitored device,
   wherein said given monitored device is connected to said other monitored devices via one or more network cables, and said given monitored device directly supplies power to said other monitored devices via said network cables, such that said prepared power control information is transmitted to said other monitored devices through said given monitored device via said network cables.

* * * * *